(12) United States Patent
Hou et al.

(10) Patent No.: US 10,510,248 B2
(45) Date of Patent: Dec. 17, 2019

(54) AUXILIARY IDENTIFICATION DEVICE FOR INDICATOR OBJECT AND AUXILIARY IDENTIFICATION AND DISPLAY METHOD THEREFOR

(71) Applicant: Wistron Corporation, New Taipei (TW)

(72) Inventors: Chia-Chang Hou, New Taipei (TW); Yu-Yen Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 57 days.

(21) Appl. No.: 15/857,627

(22) Filed: Dec. 29, 2017

(65) Prior Publication Data

US 2019/0027030 A1 Jan. 24, 2019

(30) Foreign Application Priority Data

Jul. 19, 2017 (TW) ............................. 106124089 A

(51) Int. Cl.
| | |
|---|---|
| *G08G 1/09* | (2006.01) |
| *G06K 9/62* | (2006.01) |
| *G06K 9/00* | (2006.01) |
| *G08G 1/0967* | (2006.01) |
| *G08G 1/0962* | (2006.01) |

(52) U.S. Cl.
CPC ......... *G08G 1/093* (2013.01); *G06K 9/00818* (2013.01); *G06K 9/6267* (2013.01); *G08G 1/09623* (2013.01); *G08G 1/096716* (2013.01); *G08G 1/096783* (2013.01)

(58) Field of Classification Search
CPC .................................. G01S 1/00; G02B 1/00
See application file for complete search history.

(56) References Cited

U.S. PATENT DOCUMENTS

| | | | |
|---|---|---|---|
| 8,395,529 B2 | 3/2013 | Seder et al. | |
| 2010/0253541 A1 | 10/2010 | Seder et al. | |
| 2014/0253701 A1* | 9/2014 | Wexler | ...................... A61F 9/08 348/62 |
| 2016/0351051 A1* | 12/2016 | Murthy | .............. G06K 9/00818 |

FOREIGN PATENT DOCUMENTS

| | | |
|---|---|---|
| CN | 101872070 | 10/2013 |
| TW | I359259 | 3/2012 |
| TW | I494864 | 8/2015 |

OTHER PUBLICATIONS

"Office Action of Taiwan Counterpart Application," dated Mar. 19, 2018, p. 1-p. 7.

* cited by examiner

*Primary Examiner* — Shirley Lu
(74) *Attorney, Agent, or Firm* — JCIPRNET

(57) ABSTRACT

An auxiliary identification device for indicator objects and an auxiliary identification and display method therefor are provided. The auxiliary identification device includes a camera module, a controller, and a display. The camera module is configured to obtain a video in a first direction. The controller is coupled to the camera module and is configured to capture and identify multiple indicator objects in the video. Each of the indicator objects includes indication information. The controller sorts the indicator objects to determine a priority display order of the indicator objects, and further generates a display image signal according to the priority display order. The display is coupled to the controller and is configured to sequentially display the indicator objects according to the display image signal.

18 Claims, 3 Drawing Sheets

(a)　　　　(b)　　　　(c)　　　　(d)

(e)　　　　(f)　　　　(g)　　　　(h)

AUXILIARY IDENTIFICATION DEVICE FOR INDICATOR OBJECT AND AUXILIARY IDENTIFICATION AND DISPLAY METHOD THEREFOR

CROSS-REFERENCE TO RELATED APPLICATION

This application claims the priority benefit of Taiwan application serial no. 106124089, filed on Jul. 19, 2017. The entirety of the above-mentioned patent application is hereby incorporated by reference herein and made a part of this specification.

BACKGROUND OF THE INVENTION

Field of the Invention

The disclosure relates to a navigation technique and a driver assistance technique applicable to transportation vehicles, and in particular, an auxiliary identification device for indicator objects and an auxiliary identification and display method therefor.

Description of Related Art

With the advancement of technology and the demand for real-time information, many devices now can assist a user in driving or relevant daily tasks. Examples of such devices include navigation systems, projection-type head-up displays, wearable glasses (e.g., Google Glass), etc. Therefore, the users' demand for functions of such auxiliary devices has grown significantly. Particularly, due to factors including evolution of vehicle navigation techniques, significant growth in transportation, ever-increasing complexity of roads, prevention of driver fatigue, etc., in addition to the original navigation function of the vehicle auxiliary devices, many more techniques have been developed to assist the driver.

An observation on current driver behaviors shows that too many road signs cause the image in the driver's field of view to be disorderly. Moreover, when the vehicle is traveling at a high speed, the driver's field of view becomes limited, which increases the possibility of the driver's negligence and failure to notice the road signs. In cases where some road signs are located overly close to road exit junctions, the driver's view is undesirable due to weather issues, or the driver fails to notice the road sign out of negligence, the driver will not be able to respond in time, such that the road signs fail to achieve their cautionary function as originally expected. Moreover, ads may be found on some roads and may divert the direction of the driver's gaze and cause the driver to neglect the traffic signs that should be noted. In addition, the original default information in the vehicle auxiliary devices or the information obtained from cloud servers are not updated in real time. For example, when information of some temporary road adjustments or road diversions is not instantly provided to the vehicle auxiliary devices, annoyance will be caused to the driver, and the vehicle auxiliary devices cannot obtain the information of such temporary changes in real time and assist the driver accordingly.

Therefore, it is intended that the vehicle driver assistance system or relevant techniques can use the current techniques to assist the vehicle driver to successfully learn about the road condition in real time, can avoid abrupt deceleration or sudden change of lanes of the driver due to missing road junctions or in order to see the road signs clearly, and can meanwhile provide accurate information in real time to allow the driver sufficient time to refer to the information and respond.

SUMMARY OF THE INVENTION

The disclosure provides an auxiliary identification device for indicator objects and an auxiliary identification and display method therefor that capture and identify a video in a first direction (e.g., a traveling direction of a vehicle) to display more important indicator objects (e.g., road signs) in priority for a driver to view according to the needs of a user or an automatic setting of a system, such that the driver can more easily learn about the road condition and change lanes in advance, and the user can be provided with accurate information in real time.

The auxiliary identification device for indicator objects of an embodiment of the disclosure includes a camera module, a controller, and a display. The camera module is configured to obtain a video in a first direction. The controller is coupled to the camera module and is configured to receive the video of the camera module and capture and identify a plurality of indicator objects in the video. Each of the indicator objects includes indication information. The controller sorts the indicator objects to determine a priority display order of the indicator objects, and further generates a display image signal according to the priority display order. The display is coupled to the controller and the display is configured to sequentially display the indicator objects according to the display image signal.

The auxiliary identification and display method for indicator objects of an embodiment of the disclosure includes the following steps: obtaining a video in a first direction; capturing and identifying a plurality of indicator objects in the video, wherein each of the indicator objects contains indication information, and the indicator objects are sorted to determine a priority display order of the indicator objects; and sequentially displaying the indicator objects according to the priority display order.

A computer-readable medium of an embodiment of the disclosure is configured to store a computer program, wherein the computer program implements the steps of the auxiliary identification and display method as described above when being executed by a processor.

In light of the above, the auxiliary identification device for indicator objects and the auxiliary identification and display method therefor of the embodiments of the disclosure capture and identify the video in the first direction (e.g., a traveling direction of the vehicle) through video capturing and video identification techniques to thereby obtain and confirm the indicator objects in the video and their relevant indication information. Moreover, the auxiliary identification device determines the priority display order of the indicator objects according to the importance of the indicator objects (e.g., road signs) and the demand setting to display the more important indicator objects on the front-end display screen of the driver in priority according to the demand setting for the driver to view or to remind the driver. The foregoing demand setting may be: a system default demand, a demand manually set by the user, or a demand automatically set by the auxiliary identification device according to the current situation. In some embodiments of the disclosure, when specific indicator objects (e.g., advance road exit signs) appear, the demand setting is correspondingly adjusted according to an exit distance indicated on the indicator object to dynamically adjust the priority display order of the indicator objects, such that the indicator objects of this class can be displayed in priority or the driver can be reminded when the road exit approaches, and the driver can more easily learn about the road condition and change lanes in advance.

To provide a further understanding of the aforementioned and other features and advantages of the disclosure, exemplary embodiments, together with the reference drawings, are described in detail below.

DESCRIPTION OF THE EMBODIMENTS

Figure 1:
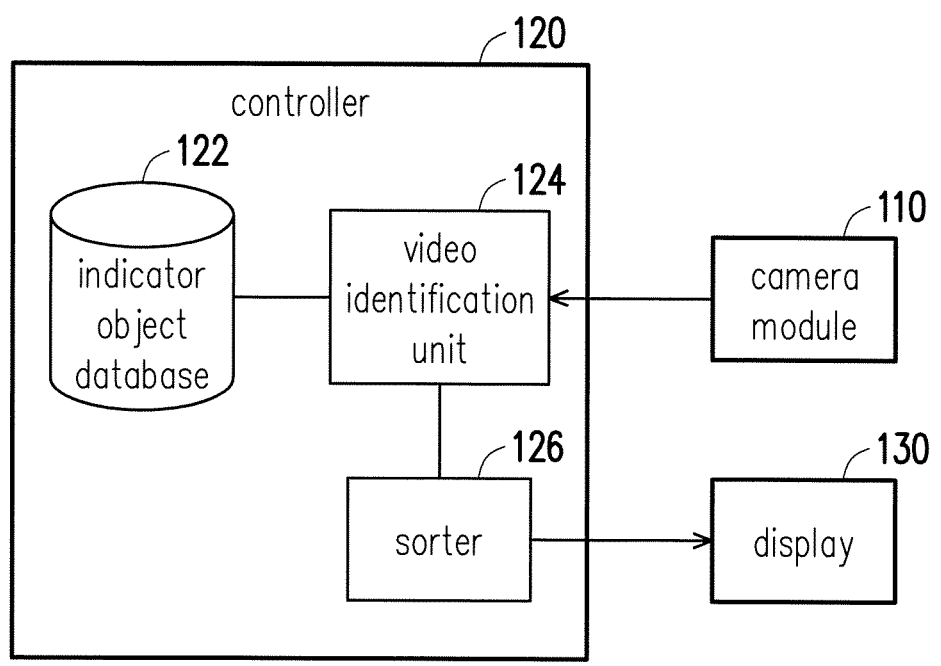
FIG. 1 is a schematic diagram illustrating an auxiliary identification device for indicator objects according to an embodiment of the disclosure.

FIG. 1 is a schematic diagram illustrating an auxiliary identification device 100 for indicator objects according to an embodiment of the disclosure. The auxiliary identification device 100 is, for example, installed on transportation vehicles, such as automobiles and buses, and may be integrated in a driver visual assistance system. In some embodiments, the auxiliary identification device 100 may also be integrated in a driver condition sensing system, e.g., a so-called driving care apparatus. Such driving care apparatus makes a driver more focused on driving and provides the driver with techniques including fatigue/distraction analysis and detection, driver wake-up flash, etc. so as to ensure safety of the driver and passengers. In some embodiments, the auxiliary identification device 100 may also be implemented by a hand-held mobile device. In other words, the hand-held mobile device implements the auxiliary identification and display method for indicator objects through executed applications. In the present embodiment, the auxiliary identification device 100 is installed on a vehicle as visual assistance for drivers.

The auxiliary identification device 100 in FIG. 1 includes a camera module 110, a controller 120, and a display 130. The camera module 110 and the display 130 are both coupled to the controller 120. The camera module 110 is configured to obtain or capture a video in a first direction. For instance, the first direction is a traveling direction of the vehicle. The video is formed by at least one image. The at least one image may be at least one continuous image or at least one non-continuous image. The camera module 100 of the present embodiment adopts a camera of a high-resolution or high-magnification lens, or a video capturing apparatus having similar functions. Any person applying the present embodiment shall be able to use various video capturing apparatuses to implement the camera module 100. The auxiliary identification device 100 described in the present embodiment continuously identifies indicator objects through the captured video during a travel of the vehicle. Therefore, the video obtained by the camera module 110 should include at least one image. The "indicator object" described in the present embodiment refers to an object containing indication information on the road, e.g., a road sign, a barricade, etc. In some embodiments, a large billboard may also be seen as an indicator object described in the present embodiment. However, the present embodiment is meant to exclude indicator objects such as large billboards that are irrelevant to road indication.

The controller 120 is a microprocessor, a microcontroller, a central processing unit (CPU), another circuit/component having multi-functional integration and processing capacity, a field programmable gate array (FPGA), or any programmable logic device and is not specifically limited here. The controller 120 of the present embodiment includes an indicator object database 122, a video identification unit 124, and a sorter 126. The indicator object database 122, the video identification unit 124, and the sorter 126 of the present embodiment are implemented by means of software, hardware, or firmware. The indicator object database 122 is stored in a memory unit (and a non-volatile memory) for storing a plurality of default sign icons for identifying the indicator objects. In the present embodiment, the indicator object database 122 mainly stores the default sign icons of road signs. The default sign icon of the present embodiment has a higher resolution, such that a more desirable view quality is obtained when the default sign icon is presented to the driver. The video identification unit 124 and the sorter 126 are circuits of hardware functions, or are software modules operated through the controller 120. The video identification unit 124 in the controller 120 receives the video from the camera module, identifies a plurality of indicator objects in the video, and captures the indicator objects. Then, the video identification unit 124 compares and identifies the captured indicator objects against the plurality of default sign icons in the indicator object database 122 to confirm the indicator object containing indication information, correctness of the indication information, and a sign class corresponding to the indicator object. Next, the sorter 126 in the controller 120 sorts the identified indicator objects to determine a priority display order of the indicator objects, and generates a display image signal according to the priority display order. Further, the sorter 126 in the controller 120 sorts the identified indicator objects according to a default demand setting or a demand setting automatically adjusted by the system. The display 130 sequentially displays the indicator objects according to the display image signal to remind the driver. The display 130 is an LCD screen or another screen that can present the icons, and the present embodiment is not limited hereto.

The "demand setting" may be obtained in three manners. In the first manner, the demand setting is a system default demand at the time of activating the auxiliary identification device 100. In the second manner, the user performs a manual setting via a user interface of the auxiliary identification device 100 according to his/her needs. In the third manner, the controller 120 automatically sets the demand setting according to a current environmental condition or a user state. For example, when the demand setting is "no speeding", the auxiliary identification device 100 displays a speed limit sign in priority to the driver to remind the driver not to overspeed. When the demand setting is "getting off a specific interchange", the auxiliary identification device 100 displays signs related to the "specific interchange" in priority and extends their display time, so that the driver has sufficient time for viewing and responding. When the demand setting is "getting to a rest area", the auxiliary identification device 100 displays signs related to the "rest area" in priority and extends their display time. The auxiliary identification device 100 automatically detects the current environmental condition (e.g., a vehicle driving speed, an in-vehicle temperature, and a vehicle condition) and the user state (e.g., detecting an undesirable mental state of the user or lurching of the vehicle) and automatically adjusts the demand setting to dynamically adjust corresponding reminder objects and thereby assist in driving of the user in a more human-centered manner.

Figure 2:
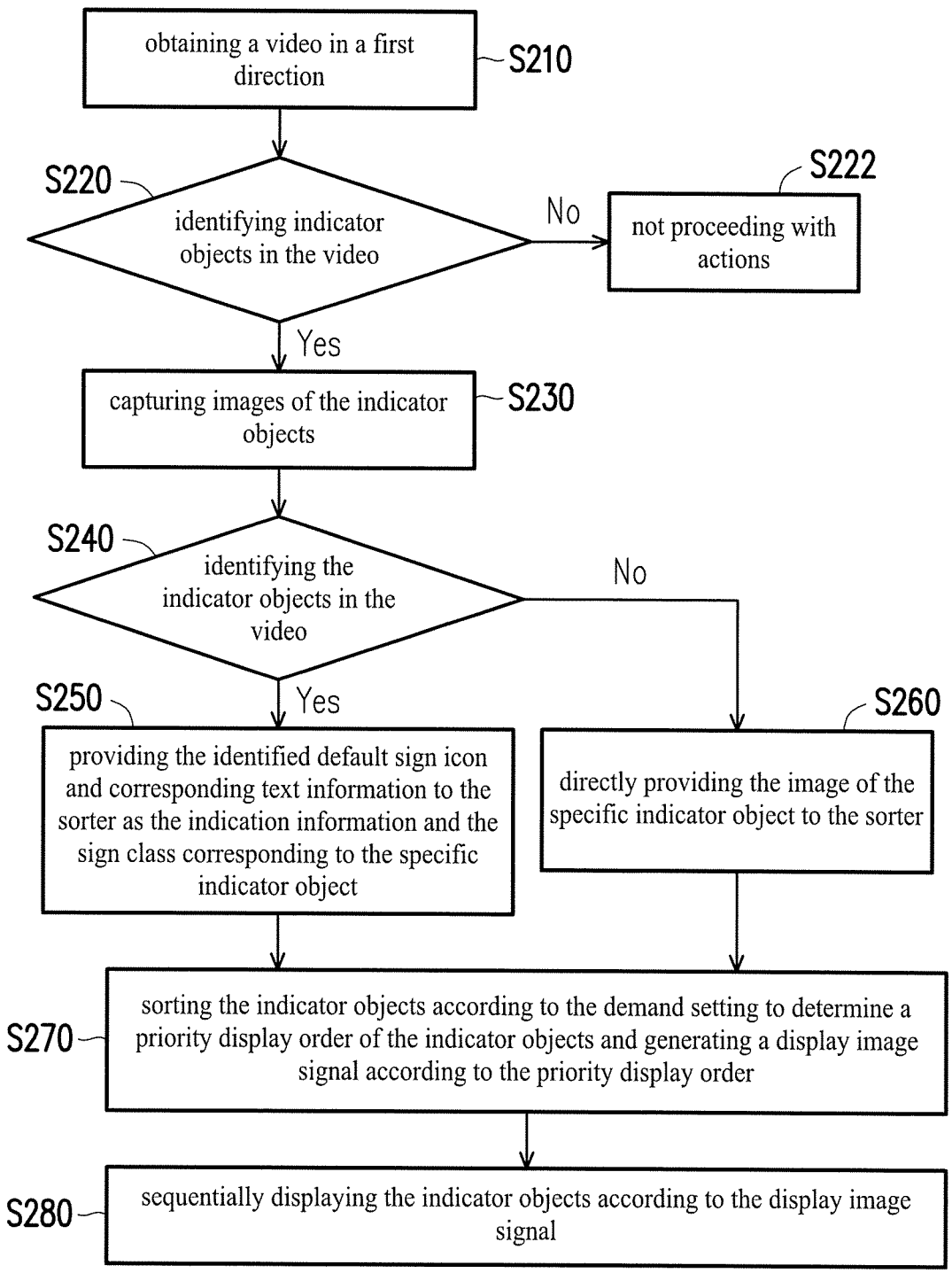
FIG. 2 is a flowchart illustrating an auxiliary identification and display method for indicator objects according to an embodiment of the disclosure.

FIG. 2 is a flowchart illustrating an auxiliary identification and display method for road signs according to an embodiment of the disclosure. The auxiliary identification and display method described in FIG. 2 is applicable to the auxiliary identification device 100 described in FIG. 1. Referring to both FIG. 1 and FIG. 2, in step S210, the video identification unit 124 in the controller 120 obtains a video in a first direction (e.g., a traveling direction of a vehicle) from the camera module 110. In step S220 to step S270, the controller 120 captures and identifies a plurality of indicator objects in the video, wherein each of the indicator objects contains indication information, and the controller 120 sorts the indicator objects according to the demand setting to determine a priority display order of the indicator objects.

Figure 3:
FIG. 3 is a schematic diagram illustrating common road signs.
Figure 3:
Figure 3:
Figure 3:
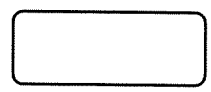
Figure 3:
Figure 3:
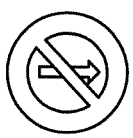
Figure 3:
Figure 3:
Figure 3:
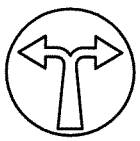
Figure 3:
Figure 3:
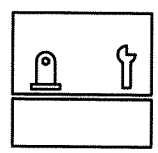
Figure 3:
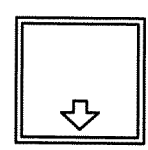
Figure 3:
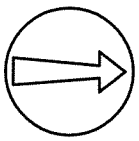
Figure 3:
Figure 3:
Figure 3:
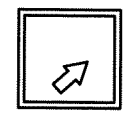

Step S220 to Step S280 are detailed below. In step S220, the video identification unit 124 identifies the indicator objects (e.g., road signs) in the video. Step S220 is also known as "road sign identification". The "road sign identification" in step S220 is detailed herein. FIG. 3 is a schematic diagram illustrating common road signs. According to the common road signs in FIG. 3, it is known that the road signs are classified by frame line colors including red, black, blue, green, etc., which form road signs in shapes including triangles, circles, diamonds, rectangles, etc., as summarized in Table 1 below. For example, the road signs in section (a) in FIG. 3 have red frame lines and are in the shape of triangles. The road signs in section (b) have red frame lines and are in the shape of circles. The road signs in section (c) have black frame lines and are in the shape of diamonds. The road signs in section (d) have black frame lines and are in the shape of rectangles. The road signs in section (e) have blue frame lines and are in the shape of circles. The road signs in section (f) have black frame lines and are in the shape of rectangles. The road signs in section (g) have blue frame lines and are in the shape of rectangles. The road signs in section (h) have green frame lines and are in the shape of rectangles. Those marked with "✓" in Table 1 are the frame line colors and shapes of the common road signs.

TABLE 1

| Frame line color | Sign shape | | | |
|---|---|---|---|---|
| | Triangle | Circle | Diamond | Rectangle |
| Red | ✓ | ✓ | | |
| Black | | | ✓ | ✓ |
| Blue | | ✓ | | ✓ |
| Green | | | | ✓ |

Accordingly, through step S220, the auxiliary identification device 100 and the auxiliary identification and display method of the present embodiment can identify the frame line colors and shapes in the video corresponding to the sections of the "road sign identification" shown in Table 1 to distinguish the indicator objects (i.e., road signs) and thereby remove unwanted information such as the large billboards from the video. The "road sign identification" of the present embodiment only looks for images in the video including the frame lines and sign shapes in Table 1 and does not recognize texts in the indicator objects (i.e., road signs) to thereby save hardware resources required for recognition. In other embodiments, all information of the indicator objects or road signs in the video may be identified in step S220. Although it can be more precisely learned whether the indicator objects are the road signs required in the present embodiment or unwanted ad images, this approach will consume a lot of identification time and hardware resources. If the indicator objects are identified from the video in step S220, enter step S230 to proceed. Conversely, if the indicator objects are not identified from the video in step S220, enter step S222 without proceeding with the subsequent actions, or return to step S210 to continue to identify whether there are indicator objects in the video.

In step S230, when the video identification unit 124 discovers that there are identified indicator objects in the video, it captures images of the indicator objects to split images of the road signs from the video. In step S240, the video identification unit 124 in the auxiliary identification device 100 compares the captured images of the indicator objects against a plurality of default sign icons stored in the indicator object database 122 to thereby identify and learn the indication information and sign classes corresponding to the indicator objects.

It is supposed here that the video identification unit 124 is identifying a specific indicator object. If the video identification unit 124 identifies the captured specific indicator object as one of the default sign icons, enter step S250 from step S240 to provide the identified default sign icon and corresponding text information to the sorter 126 as the indication information and the sign class corresponding to the specific indicator object. Conversely, if the video identification unit 124 fails to identify the captured specific indicator object as one of the default sign icons, enter step S260 from step S240 to directly provide the image of the specific indicator object to the sorter 126 to replace the indication information and the sign class corresponding to the specific indicator object of the identified default sign icon and the corresponding text information.

In step S270, the sorter 126 in the controller 120 sorts the indicator objects according to the demand setting and the indication information and the sign classes of the indicator objects to determine a priority display order of the indicator objects and generate a display image signal according to the priority display order. In other words, the indication information and the sign classes are the basis for determining the priority display order of the indicator objects. In step S280, the display 130 sequentially displays the indicator objects (road signs) according to the display image signal. Specifically, according to the demand setting and the indication information and the sign classes corresponding to the indicator objects (road signs), the sorter 126 sets weightings corresponding to the identified indicator objects (road signs), and the weightings are the basis for the priority display order. The demand setting changes the weightings corresponding to the indicator objects (road signs) of different sign classes to thereby obtain different priority display orders under different conditions of the demand setting.

As an example, the indicator objects of the present embodiment are the road signs. According to their sign classes, the common road signs are classified as "warning signs", "prohibitory signs", "mandatory signs", "guide signs", "auxiliary signs", "advance exit signs", "work zone signs", etc. In the present embodiment, the priority display order of the road signs usually follows the following order: the "warning signs" take priority over the "prohibitory signs", over the "mandatory signs", over the "work zone signs", over the "advance exit signs", over the "guide signs", and over the "auxiliary signs". In other words, the auxiliary identification device 100 captures the road signs in the traveling direction of the vehicle and sequentially displays them to the driver according to the priority display order.

Therefore, the more importation road signs, including the "warning signs", the "prohibitory signs", and the "mandatory signs", are displayed to the driver in priority after the video is captured and identified.

On the other hand, the sorter 126 in the controller 120 of FIG. 1 further dynamically adjusts the demand setting according to an exit distance marked on some of the indicator objects (e.g., the "advance exit signs") to thereby dynamically adjust the priority display order of the indicator objects. In other words, the sorter 126 determines whether the sign classes of the road signs include a specific class (e.g., the "advance exit signs"), and when the exit distance of the road sign corresponding to the specific class is less than a default distance (e.g., when the exit distance indicated on the road sign is less than 2,000 meters), the driver supposedly would like to clearly see the "advance exit sign" at this moment. Therefore, the controller 120 dynamically adjusts the demand setting as "getting off a specific interchange", and the sorter 126 in the controller 120 dynamically adjusts the priority display order of the road signs by prioritizing the road signs relevant to the "specific interchange" in the class of the "advance exit signs" in the priority display order, such that the indicator objects corresponding to the specific class ("advance exit signs") are displayed on the display 130 in priority.

For example, the original priority display order is: the "warning signs" take priority over the "prohibitory signs", over the "mandatory signs", over the "work zone signs", over the "advance exit signs", over the "guide signs", and over the "auxiliary signs". When the exit distance in the "advance exit sign" is less than 2,000 meters, the priority display order is adjusted as: the "warning signs" take priority over the "advance exit signs", over the "prohibitory signs", over the "mandatory signs", over the "work zone signs", over the "guide signs", and over the "auxiliary signs". The priority display order and the demand setting described in the present embodiment may also be defined by the driver according to his/her needs.

The sorter 126 of FIG. 1 of the present embodiment further causes the controller 120 to automatically adjust the demand setting according to the driving speed of the transportation vehicle on which the camera module 110 is installed to thereby dynamically adjust the priority display order of the road signs. For example, when the driving speed of the transportation vehicle is overly high, the controller 120 automatically adjusts the demand setting as "no speeding", and the sorter 126 in the controller 120 displays the speed limit sign to the driver in priority to remind the driver not to overspeed.

In the present embodiment, the indicator object database 122 further stores maps containing road sign locations, and the location of the vehicle on the maps is obtained through positioning information (e.g., a global positioning system) to learn the locations of the nearby road signs and thereby determine which classes of the road signs to display in priority. If the video captured by the camera module 110 on site of the vehicle deviates from the road signs stored in the indicator object database 122, the controller 120 will base its notifications to the driver on the video captured on site of the vehicle in real time.

In summary of the above, the auxiliary identification device for indicator objects and the auxiliary identification and display method therefor described in the embodiments of the disclosure capture and identify the video in the traveling direction of the vehicle through video capturing and video identification techniques to thereby obtain and confirm the indicator objects in the video and their relevant indication information. Moreover, according to the importance of the indicator objects (e.g., road signs) and the demand setting, the auxiliary identification device determines the priority display order of the indicator objects to display the more important indicator objects on the front-end display screen of the driver in priority according to the demand setting for the driver to view or to remind the driver. The foregoing demand setting may be: a system default demand, a demand manually set by the user, or a demand automatically set by the auxiliary identification device according to the current situation. In some embodiments of the disclosure, when specific road signs (e.g., the advance road exit signs) appear, the demand setting is correspondingly adjusted according to the exit distance indicated on the road sign to further dynamically adjust the priority display order of the road signs, such that the road signs of this class can be displayed in priority or the driver can be reminded when the road exit approaches, and the driver can more easily learn about the road condition and change lanes in advance.

Although the disclosure is disclosed as the embodiments above, the embodiments are not meant to limit the disclosure. Any person skilled in the art may make slight modifications and variations without departing from the spirit and scope of the disclosure. Therefore, the protection scope of the disclosure shall be defined by the claims attached below.

What is claimed is:

1. An auxiliary identification device for real-time acquiring road condition relating to a traveling vehicle, comprising:
   a camera module configured to obtain a video in a first direction of the traveling vehicle;
   a controller coupled to the camera module and configured to receive the video obtained by the camera module and capture and identify a plurality of indicator objects in the video, wherein each of the indicator objects comprises indication information, and the controller sorts the indicator objects to determine a priority display order of the indicator objects and further generates a display image signal according to the priority display order; and
   a display coupled to the controller and the display is configured to sequentially display the indicator objects according to the display image signal.

2. The auxiliary identification device according to claim 1, wherein the controller comprises:
   an indicator object database configured to store a plurality of default sign icons for identifying the indicator objects; and
   a video identification unit configured to identify the indicator objects in the video according to the default sign icons to confirm the indication information and sign classes corresponding to the indicator objects.

3. The auxiliary identification device according to claim 2, wherein the controller further comprises:
   a sorter coupled to the video identification unit and the sorter is configured to sort the indicator objects according to the indication information and the sign classes of the indicator objects to determine the priority display order of the indicator objects, and the sorter is configured to generate the display image signal according to the priority display order.

4. The auxiliary identification device according to claim 3, wherein an image of a specific indicator object is directly provided to the sorter to replace the indication information and the sign class corresponding to the specific indicator object when the video identification unit fails to identify the specific indicator object, and an identified one of the default sign icons and corresponding text information are provided to the sorter as the indication information and the sign class corresponding to the specific indicator object when the video identification unit identifies the specific indicator object as the one of the default sign icons.

5. The auxiliary identification device according to claim 1, wherein the controller sorts the indicator objects according to a demand setting, the demand setting is set by a system default demand, the demand setting is manually set by a user via a user interface, or the demand setting is automatically set by the controller according to a current environmental condition or a user state.

6. The auxiliary identification device according to claim 1, wherein the controller sets weightings corresponding to the indicator objects according to the indication information and the sign classes corresponding to the indicator objects to determine the priority display order of the indicator objects.

7. The auxiliary identification device according to claim 5, wherein the controller further automatically adjusts the demand setting according to an exit distance marked on the indication information to dynamically adjust the priority display order of the indicator objects.

8. The auxiliary identification device according to claim 7, wherein the controller automatically adjusts the demand setting to dynamically adjust the priority display order of the indicator objects to thereby display the indicator objects corresponding to a specific class on the display in priority, when it is determined that the sign classes of the indicator objects comprise the specific class and the exit distance of the indicator object corresponding to the specific class is less than a default distance.

9. The auxiliary identification device according to claim 5, wherein the controller further automatically adjusts the demand setting according to a driving speed of a transportation vehicle on which the camera module is installed to dynamically adjust the priority display order of the indicator objects.

10. The auxiliary identification device according to claim 1, wherein the auxiliary identification device is suitable for use in a driver visual assistance system.

11. An auxiliary identification and display method for real-time acquiring road condition relating to a traveling vehicle, comprising:

obtaining a video in a first direction of the traveling vehicle;

capturing and identifying a plurality of indicator objects in the video, wherein each of the indicator objects comprises indication information, and the indicator objects are sorted to determine a priority display order of the indicator objects; and sequentially displaying the indicator objects according to the priority display order.

12. The auxiliary identification and display method according to claim 11, wherein the step of identifying the indicator objects in the video comprises:

identifying the indicator objects in the video according to a plurality of default sign icons stored in an indicator object database to confirm the indication information and sign classes corresponding to the indicator objects;

using an identified one of the default sign icons and corresponding text information as the indication information and the sign class corresponding to a specific indicator object to determine a basis for the priority display order of the indicator objects when the specific indicator object is identified as the one of the default sign icons; and using an image of the specific indicator object as the basis for determining the priority display order of the indicator objects when the specific indicator object fails to be identified.

13. The auxiliary identification and display method according to claim 11, wherein the indicator objects are sorted according to a demand setting, wherein the auxiliary identification and display method further comprising:

setting the demand setting by a system default demand, manually setting the demand setting by a user via a user interface, or automatically setting the demand setting according to a current environmental condition or a user state.

14. The auxiliary identification and display method according to claim 11, wherein the step of sorting the indicator objects to determine the priority display order of the indicator objects comprises:

setting weightings corresponding to the indicator objects according to the indication information and the sign classes corresponding to the indicator objects to determine the priority display order of the indicator objects.

15. The auxiliary identification and display method according to claim 13, wherein the step of sorting the indicator objects according to the demand setting to determine the priority display order of the indicator objects further comprises:

automatically adjusting the demand setting according to an exit distance marked on the indicator objects to dynamically adjust the priority display order of the indicator objects.

16. The auxiliary identification and display method according to claim 15, wherein the step of automatically adjusting the demand setting according to the exit distance marked on the indicator objects to dynamically adjust the priority display order of the indicator objects comprises:

automatically adjusting the demand setting to dynamically adjust the priority display order of the indicator objects to thereby display the indicator objects corresponding to a specific class in priority, when it is determined that the sign classes of the indicator objects comprise the specific class and the exit distance of the indicator object corresponding to the specific class is less than a default distance.

17. The auxiliary identification and display method according to claim 13, wherein the step of sorting the indicator objects according to the demand setting to determine the priority display order of the indicator objects further comprises:

automatically adjusting the demand setting according to a driving speed of a transportation vehicle to dynamically adjust the priority display order of the indicator objects.

18. A non-transitory computer-readable medium storing a computer program, wherein the computer program implements the steps of the auxiliary identification and display method as described in claim 11 while being executed by a processor.

* * * * *